US011935451B2

(12) United States Patent
Hyun et al.

(10) Patent No.: US 11,935,451 B2
(45) Date of Patent: *Mar. 19, 2024

(54) DISPLAY DEVICE AND METHOD FOR ADJUSTING GRADATION VALUE

(71) Applicant: Samsung Display Co., Ltd., Yongin-Si (KR)

(72) Inventors: Chang Ho Hyun, Seoul (KR); Kyemoon Lee, Seoul (KR); Jachul Hwangse, Suwon-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/079,800

(22) Filed: Dec. 12, 2022

(65) Prior Publication Data

US 2023/0114324 A1 Apr. 13, 2023

Related U.S. Application Data

(63) Continuation of application No. 17/213,435, filed on Mar. 26, 2021, now Pat. No. 11,527,187.

(30) Foreign Application Priority Data

May 28, 2020 (KR) ........................ 10-2020-0064118

(51) Int. Cl.
*G09G 3/20* (2006.01)

(52) U.S. Cl.
CPC ....... *G09G 3/20* (2013.01); *G09G 2320/0233* (2013.01); *G09G 2320/0271* (2013.01); *G09G 2320/0626* (2013.01)

(58) Field of Classification Search
CPC ............. G09G 3/20; G09G 2320/0233; G09G 2320/0271; G09G 2320/0626
See application file for complete search history.

(56) References Cited

U.S. PATENT DOCUMENTS

| | | | | |
|---|---|---|---|---|
| 8,373,728 | B2 | 2/2013 | Ozawa et al. | |
| 9,646,577 | B2 | 5/2017 | DeLuca | |
| 9,704,216 | B1 * | 7/2017 | Laskar | G06F 3/012 |
| 10,417,952 | B2 | 9/2019 | Yan | |
| 10,586,483 | B2 | 3/2020 | Park et al. | |

(Continued)

FOREIGN PATENT DOCUMENTS

| | | | |
|---|---|---|---|
| CN | 109872670 | A | 6/2019 |
| CN | 110634434 | A | 12/2019 |

(Continued)

*Primary Examiner* — Gene W Lee
(74) *Attorney, Agent, or Firm* — Innovation Counsel LLP

(57) ABSTRACT

Provided is a display device for providing a constant brightness for each area by including an area sensing part configured to determine a position value of an input image in the display device, and determine an area range according to the position value to output an area value, a gradation value determining part configured to output a first gradation value corresponding to a brightness of the input image according to the area value, a control part configured to output a corrected gradation value corresponding to the first gradation value, and a display part configured to display a corrected image having the corrected brightness corresponding to the corrected gradation value.

19 Claims, 8 Drawing Sheets

(56) References Cited

U.S. PATENT DOCUMENTS

| | | | | |
|---|---|---|---|---|
| 2010/0020092 | A1 | 1/2010 | Canu et al. | |
| 2015/0310791 | A1 * | 10/2015 | Croxford | G09G 5/10 345/589 |
| 2017/0142244 | A1 * | 5/2017 | Jeong | G09G 5/30 |
| 2019/0138092 | A1 | 5/2019 | Song | |
| 2019/0196635 | A1 | 6/2019 | Park et al. | |
| 2019/0373166 | A1 * | 12/2019 | Jia | G09G 3/2003 |
| 2020/0098318 | A1 | 3/2020 | Liu et al. | |
| 2020/0135147 | A1 | 4/2020 | Tang et al. | |
| 2020/0394964 | A1 | 12/2020 | Hyun et al. | |
| 2021/0327971 | A1 | 10/2021 | Hyun et al. | |
| 2021/0343258 | A1 | 11/2021 | Kim et al. | |

FOREIGN PATENT DOCUMENTS

| | | | |
|---|---|---|---|
| KR | 10-1501949 | B1 | 3/2015 |
| KR | 10-2018-0050473 | A | 5/2018 |
| KR | 10-2021-0128554 | A | 10/2021 |

* cited by examiner

DISPLAY DEVICE AND METHOD FOR ADJUSTING GRADATION VALUE

CROSS-REFERENCE TO RELATED APPLICATIONS

This application is a continuation application of U.S. patent application Ser. No. 17/213,435 filed on Mar. 26, 2021, which claims priority under 35 U.S.C. § 119 to Korean Patent Application No. 10-2020-0064118, filed on May 28, 2020, the entire contents of which are hereby incorporated by reference.

BACKGROUND

The present disclosure herein relates to a display device and a method for adjusting a gradation value, and more particularly, to a method for adjusting a gradation value to reduce the difference in brightness between areas, and a display device having enhanced reliability.

A display device such as a television, a mobile phone, a navigator, or a computer monitor is provided with a display panel. The display device is classified into a plasma display panel, a liquid crystal display panel, an organic light emitting display panel, or the like, according to the type of the display panel.

For the display device provided with any one among the display panels, a resolution (the number of distinct pixels in each dimension) of one area may be different from that of the other area which surrounds the one area according to the arrangement of electronic components.

The display device may decrease or increase the brightness of pixels arranged in the one area in order to enhance the visibility of a user.

SUMMARY

The present disclosure provides a display device of which reliability is improved.

The present disclosure provides a method for adjusting a gradation value, which is capable of reducing the difference in brightness.

An embodiment of the present inventive concept provides a display device including: an area sensing part configured to determine a position value of an input image in the display device and determine an area range according to the position value to output an area value; a gradation value determining part configured to receive the area value and output a first gradation value corresponding to a brightness of the input image according to the area value; a control part configured to output a corrected gradation value corresponding to the first gradation value; and a display part configured to display a corrected image having the corrected brightness corresponding to the corrected gradation value, wherein the area range includes a first display area and a second display area, the brightness of the input image is a first display brightness when the area range of the input image is the first display area, the brightness of the input image is a second display brightness when the area range of the input image is the second display area, and the first display brightness is smaller than the second display brightness for the same gradation.

In an embodiment, a resolution of the first display area may be greater than that of the second display area.

In an embodiment, the first display area may surround the second display area.

In an embodiment, when the area range of the input image is the first display area, the gradation value determining part does not output the first gradation value, the control part does not output the corrected gradation value, and the display part displays the image which has a non-corrected brightness.

In an embodiment, the corrected brightness and the second display brightness may be different from each other.

In an embodiment, the corrected brightness may be smaller than the second display brightness.

In an embodiment, the corrected brightness may be substantially the same as the first display brightness.

In an embodiment, the display device may further include a proximity sensor configured to recognize a distance between the display device and a user.

In an embodiment, as the recognized distance becomes smaller, the corrected brightness may decrease.

In an embodiment, the proximity sensor may include an optical sensor or a thermal sensor.

In an embodiment, a light transmittance of the first display area may be smaller than that of the second display area.

In an embodiment, the display device may further include a camera module arranged under the second display area.

In an embodiment of the present inventive concept, a method for adjusting a gradation value includes: determining a position value of an input image, and determining an area range according to the position value to output an area value; outputting a first gradation value corresponding to a brightness of the input image according to the area value; outputting a corrected gradation value corresponding to the first gradation value; and displaying a corrected image having a corrected brightness corresponding to the corrected gradation value, wherein the area range includes a first display area and a second display area, the brightness of the input image is a first display brightness when the area range of the input image is the first display area, the brightness of the input image is a second display brightness when the area range of the input image is the second display area, and the first display brightness is smaller than the second display brightness for the same gradation.

In an embodiment, the input image may be displayed when the area range of the input image is the first display area.

In an embodiment, the corrected brightness and the second display brightness may be different from each other.

In an embodiment, the corrected brightness may be smaller than the second display brightness.

In an embodiment, the corrected brightness may be substantially the same as the first display brightness.

In an embodiment, the method may further include recognizing a distance between the image and a user using a proximity sensor.

In an embodiment, as the recognized distance becomes smaller, the corrected brightness may decrease.

In an embodiment, the proximity sensor may include an optical sensor or a thermal sensor.

BRIEF DESCRIPTION OF THE FIGURES

The accompanying drawings are included to provide a further understanding of the present inventive concept, and are incorporated in and constitute a part of this specification. The drawings illustrate exemplary embodiments of the present inventive concept and, together with the description, serve to explain principles of the present inventive concept. In the drawings.

and

Figure 7:
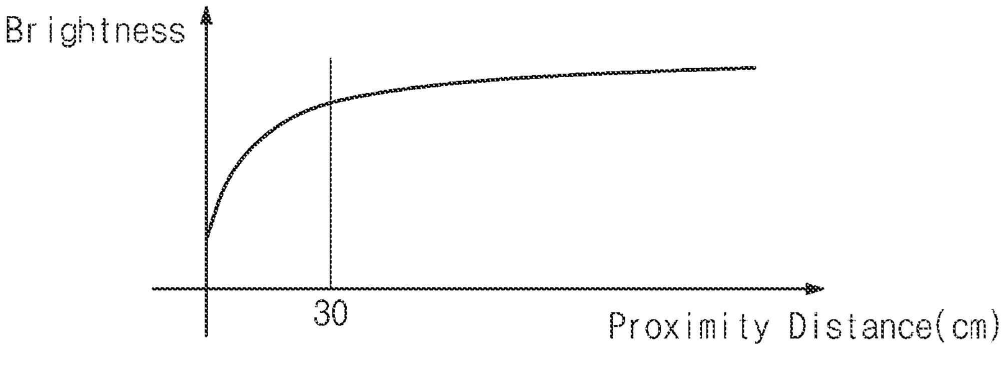

FIG. 7 illustrates a brightness graph according to a proximal distance from second pixels according to an embodiment of the present inventive concept.

DETAILED DESCRIPTION

The present inventive concept may be variously modified and realized in various forms, and thus specific embodiments will be exemplified in the drawings and described in detail hereinafter. However, it will be understood that the present inventive concept is not intended to be limited to the specific forms set forth herein, and all changes, equivalents, and substitutions included in the technical scope and spirit of the present inventive concept are included.

It will be understood that when an element or layer is referred to as being "on", "connected to" or "coupled to" another element or layer, it can be directly on, connected or coupled to the other element or layer, or intervening elements or layers may be present therebetween.

Like reference numerals in the drawings refer to like elements. In addition, in the drawings, the thickness, the ratio, or the dimension of the element are exaggerated for effective description of the technical contents.

The term "and/or" includes any and all combinations of one or more of the associated items.

Terms such as "first", "second", and the like may be used to describe various components, but the terms are used only to discriminate one component from another component. For instance, a first component may be referred to as a second component, or similarly, a second component may be referred to as a first component, without departing from the scope of the present disclosure. As used herein, the singular forms "a," "an," and "the" may be intended to include the plural forms as well, unless the context clearly indicates otherwise.

In addition, the terms such as "under", "lower", "on", and "upper" are used for explaining associations of items illustrated in the drawings. It will be understood that the spatially relative terms are intended to encompass different orientations of the device in use or operation in addition to the orientation depicted in the figures.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be further understood that the terms "comprises", "comprising,", "includes" and/or "including", when used herein, specify the presence of stated features, integers, steps, operations, elements, components or combinations thereof, but do not preclude the presence or addition of one or more other features, integers, steps, operations, elements, components, or combinations thereof.

Hereinafter, a display device according to the present inventive concept will be described in detail with reference to the accompanying drawings.

Figure 1A:
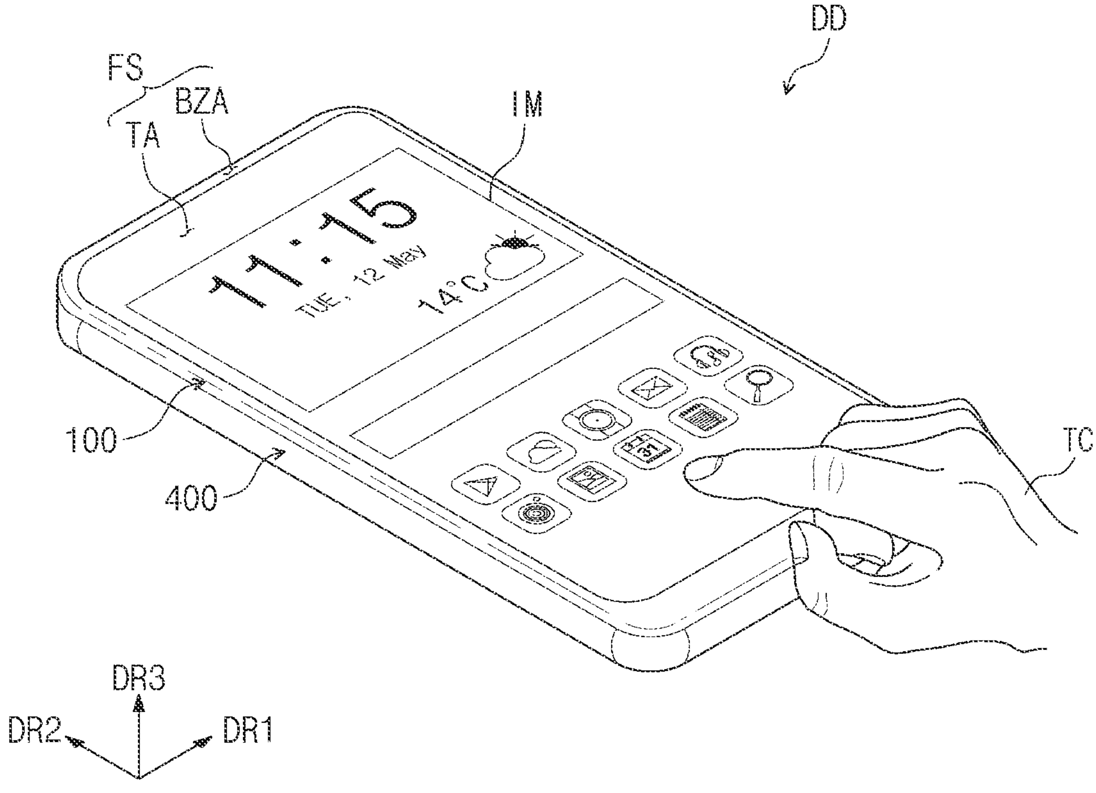
FIG. 1A is an assembled perspective view of a display device according to an embodiment of the present inventive concept.
Figure 1B:
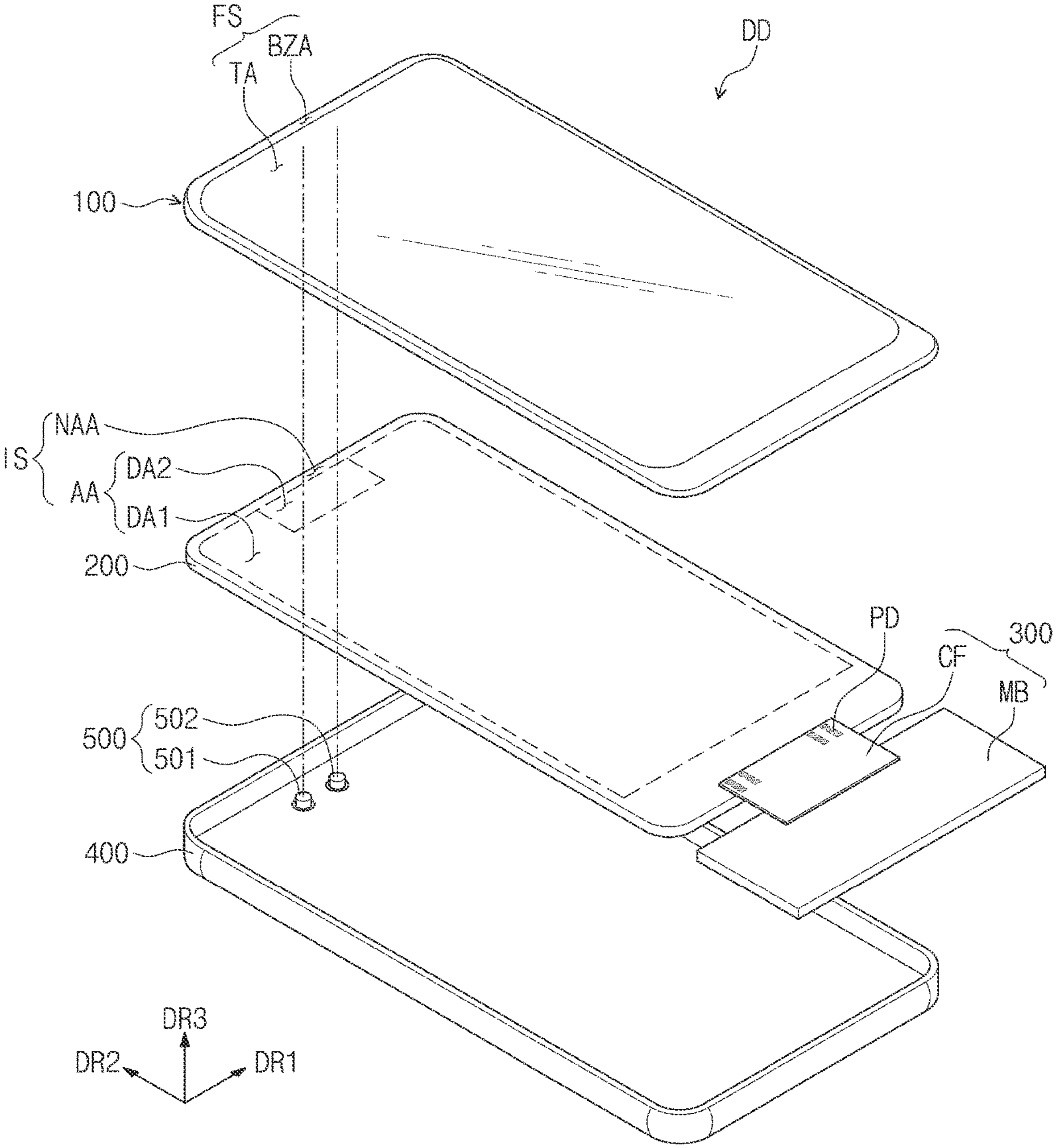
FIG. 1B is an exploded perspective view of a display device according to an embodiment of the present inventive concept.
Figure 2A:
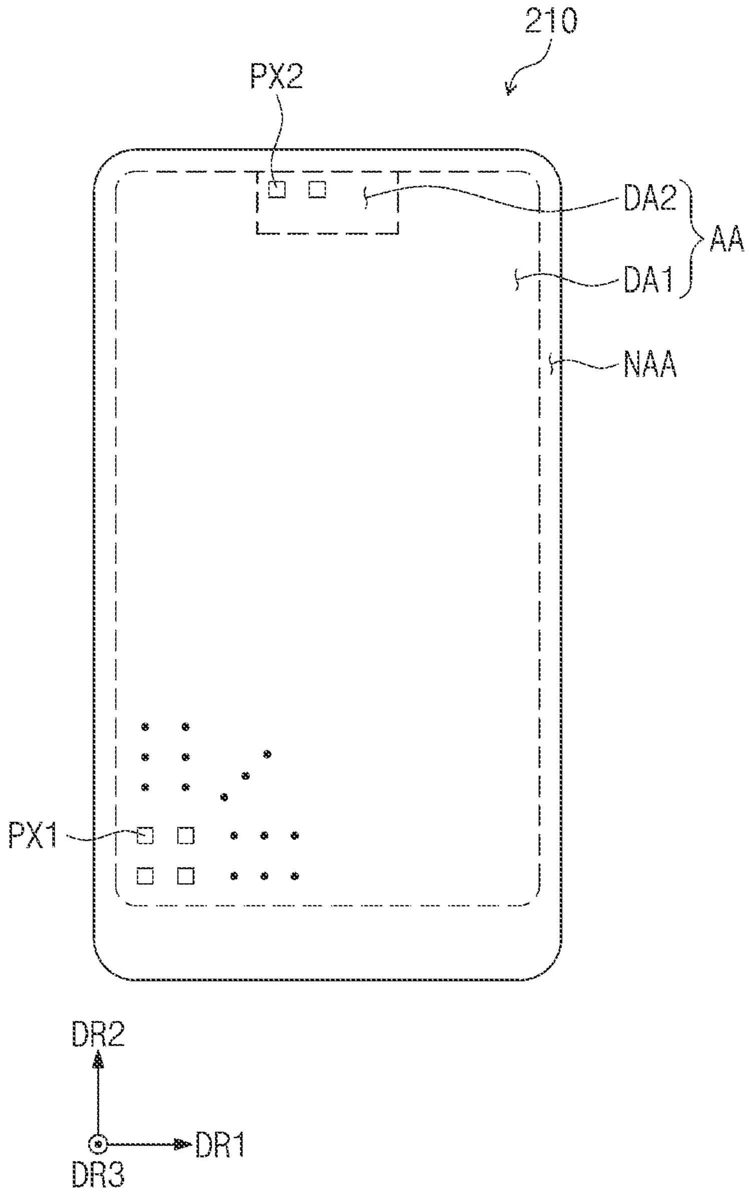
FIG. 2A is a plan view of a display panel according to an embodiment of the present inventive concept.
Figure 2B:
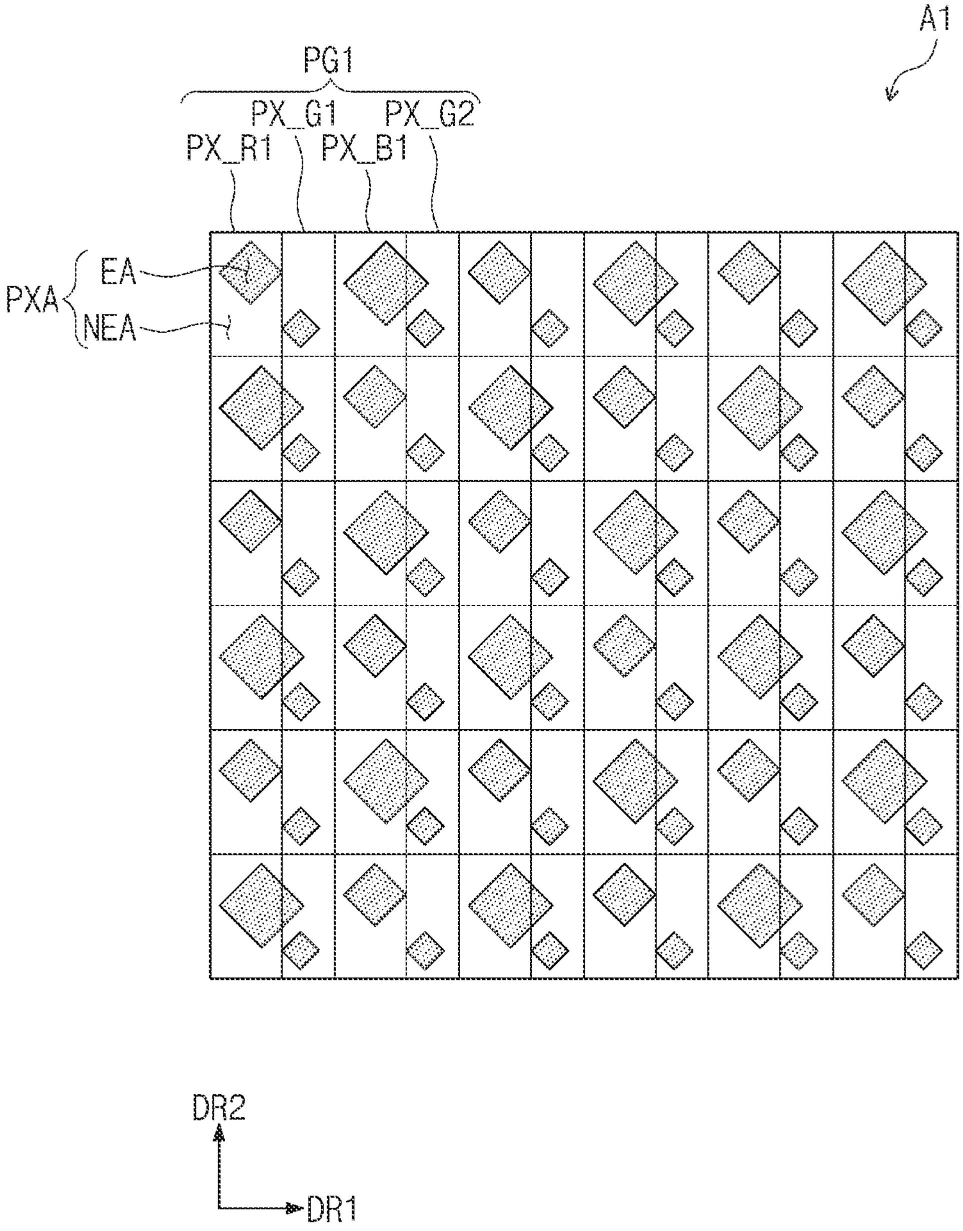
FIG. 2B is an enlarged plan view of a portion of a first display area according to an embodiment of the present inventive concept.
Figure 2C:
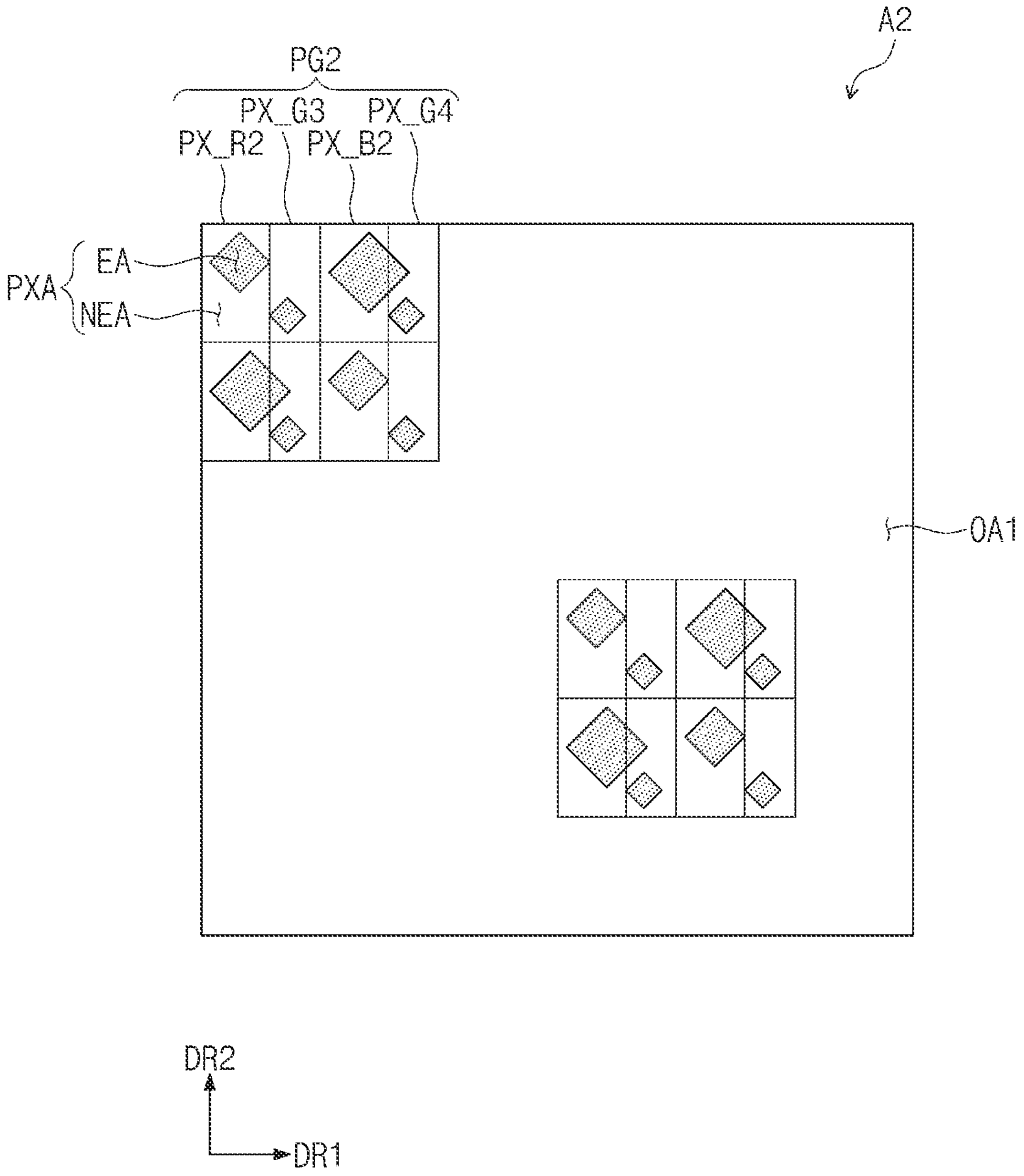
FIG. 2C is an enlarged plan view of a portion of a second display area according to an embodiment of the present inventive concept.

FIG. 1A is an assembled perspective view of a display device DD according to an embodiment of the present inventive concept. FIG. 1B is an exploded perspective view of the display device DD according to an embodiment of the present inventive concept. FIG. 2A is a plan view of a display panel 210 according to an embodiment of the present inventive concept. FIG. 2B is an enlarged plan view of a portion of a first display area DA1 according to an embodiment of the present inventive concept. FIG. 2C is an enlarged plan view of a portion of a second display area DA2 according to an embodiment of the present inventive concept.

Referring to FIGS. 1A and 1B, the display device DD may be activated in response to an electrical signal. The display device DD may include various embodiments. For example, the display device DD may include a tablet, a notebook computer, a computer, a television, or the like. In the present embodiment, the display device DD is exemplarily illustrated as a smartphone.

The display device DD may display an image IM on a display surface FS which is disposed parallel to a plane formed by a first direction DR1 and a second direction DR2 towards a third direction DR3. The display surface FS on which the image IM is displayed may correspond to the front surface of the display device DD which is the front surface FS of a window 100. Hereinafter, the display surface and the front surface of the display device DD, and the front surface of the window 100 will be referred to with the same reference character FS. The image IM may include a still image as well as a moving image. In FIG. 1A, a clock window and application icons are illustrated as an example of the image IM.

In the present embodiment, the front surface (or the upper surface) and the rear surface (or the lower surface) of each member are defined with respect to the image IM. The front surface and the rear surface are disposed opposite to each other in the third direction DR3 with respect to the image IM. Directions indicated by the first to third directions DR1, DR2, and DR3 are relative concepts and may be changed to other directions.

The display device DD may include a window 100, a display module 200, a driving circuit part 300, a housing 400, and electronic modules 500. In the present embodiment, the window 100 and the housing 400 are combined to form the appearance of the display device DD.

The window 100 may include an insulation material which is optically transparent. For example, the window 100 may include glass or plastic. The window 100 may have a multilayer structure or a single-layer structure. For example, the window 100 may include a plurality of plastic films bonded to each other using an adhesive, or a glass substrate and a plastic film bonded to each other using an adhesive.

The front surface FS of window 100 may include a transmission area TA and a bezel area BZA in a plan view. In the present specification, the expression of "in a plan view" may mean when viewed from the third direction DR3. In addition, "thickness direction" may mean the third direction DR3.

The transmission area TA may be an optically transparent area. The bezel area BZA may have a relatively low light transmittance in comparison to the transmission area TA. The bezel area BZA may define the shape of the transmission area TA. The bezel area BZA may be disposed adjacent to the transmission area TA and surround the transmission area TA.

The bezel area BZA may have a prescribed color. The bezel area BZA may cover a non-active area NAA of the display module 200 to block the non-active area NAA from being visibly recognized by the user. On the other hand, these are exemplarily illustrated, and the bezel area BZA may be omitted in the window 100 according to an embodiment of the present inventive concept.

The display module 200 may be disposed under the window 100. In the present specification, "under" may mean an opposite direction of a direction in which the display module 200 provides an image. The display module 200 may display the image IM and sense a user input TC. The display module 200 includes the front surface IS including an active area AA and the non-active area NAA. The active area AA may be activated in response to an electrical signal.

In the present embodiment, the active area AA may be an area on which the image IM is displayed and the user input TC is sensed. The transmission area TA overlaps at least the active area AA. For example, the transmission area TA overlaps the entire surface of or at least a part of the active area AA. Accordingly, a user may visibly recognize the image IM or provide the user input TC through the transmission area TA.

The non-active area NAA may be covered with the bezel area BZA. The non-active area NAA is disposed adjacent to the active area AA. The non-active area NAA may surround the active area AA. In the non-active area NAA, a driving circuit or driving lines for driving the active area AA may be disposed.

In the present embodiment, the display module 200 is assembled in a flat state in which the active area AA and the non-active area NAA face the window 100. However, this is only exemplary and a portion of the non-active area NAA may be assembled in a curved state in which the non-active area NAA of the display module is curved. In this case, a bezel area BZA in a plan view may be decreased. Alternatively, in the display module 200, a portion of the active area AA may also be assembled in a curved state. Alternatively, in the display module 200 according to an embodiment of the present inventive concept, the non-active area NAA may be omitted.

The active area AA of the display module 200 may include a plurality of display areas. The plurality of display areas may have different light transmittances. As an example of the present inventive concept, the active area AA of the display module 200 may include a first display area DA1 and a second display area DA2. The second display area DA2 may have a higher light transmittance than that of the first display area DAL The driving circuit part 300 may be electrically connected to the display module 200. The driving circuit part 300 may include a main circuit board MB and a flexible film CF.

The flexible film CF is electrically connected to the display module 200. The flexible film CF may be connected to pads PD of the display module 200 which are arranged in the non-active area NAA. The flexible film CF provides an electrical signal for driving the display module 200 to the display module 200. The electrical signal may be generated from the flexible film CF or the main circuit board MB. The main circuit board MB may include various types of driving circuits for driving the display module, a connector for supplying power, or the like.

The electronic modules 500 may include a first electronic module 501 and a second electronic module 502. The first and second electronic modules 501 and 502 may overlap the second display area DA2 in a plan view. The first and second electronic modules 501 and 502 may be arranged under the display module 200. The first and second electronic modules 501 and 502 may receive an external input through the second display area DA2 or output a signal through the second display area DA2. In other words, since the second display area DA2 has a higher light transmittance than that of the first display area DA1, the electronic modules 500 may easily transmit and/or receive a signal through the second display area DA2.

Each of the first and second electronic modules 501 and 502 may include at least any one among an acoustic output module AOM, a light emitting module LM, a light receiving module LRM, and a camera module CMM. For example, the first electronic module 501 may include a proximity sensor for sensing the distance between the user and the display device DD. For example, the first electronic module 501 may be an optical sensor or a thermal sensor. The first electronic module 501 may sense an external subject, heat, or the like through the second display area DA2. For example, the second electronic module 502 may be the camera module CMM. The second electronic module 502 may capture an external image through the second display area DA2.

The housing 400 is coupled to the window 100. The housing 400 is coupled to the window 100 to provide an internal space. The display module 200 and the electronic modules 500 may be accommodated in the internal space.

The housing 400 may include a material having relatively high stiffness. For example, the housing 400 may include a plurality of frames and/or plates including glass, plastic, metal, or a combination thereof. The housing 400 may stably protect components of the display device DD accommodated in the internal space from an external shock.

Referring to FIGS. 1B and 2A, the display panel 210 may include the first display area DA1 and the second display area DA2. The first display area DA1 and the second display area DA2 may correspond to the active area AA of the display module 200 (see FIG. 1B).

The electronic modules 500 (see FIG. 1B) may be arranged under the second display area DA2. The light transmittance of the second display area DA2 may be higher than that of the first display area DA1. Accordingly, a signal may be easily transmitted and/or received to and/or from the electronic modules 500 through the second display area DA2. In order to increase the light transmittance, some components in the second display area DA2 may be omitted compared with components in the first display area DAL For example, some pixels arranged in the second display area DA2 may be removed.

The first display area DA1 and the second display area DA2 may be adjacent to each other. The second display area DA2 may have a rectangular shape, and at least one side of the second display area DA2 may be disposed adjacent to the first display area DA1. For example, the first display area DA1 may surround the second display area DA2. FIG. 2A exemplarily illustrates that three sides of the second display area DA2 are disposed adjacent to the first display area DA1 and the remaining one side is disposed adjacent to the non-active area NAA. However, the embodiment of the present inventive concept is not limited thereto. In addition, as an example of the present inventive concept, the second display area DA2 may be disposed in an upper portion of the display panel 210 in a plan view.

Referring to FIGS. 2A and 2B, a plurality of first pixels PX1 may be arranged in the first display area DAL The first pixels PX1 may be arranged separate from each other in the first direction DR1 and the second direction DR2.

The first pixels PX1 may include a plurality of red pixels PX_R1, a plurality of green pixels PX_G1 and PX_G2, and a plurality of blue pixels PX_B1. The first pixels PX1 may be grouped into a plurality of first pixel groups PG1. For example, the first pixel groups PG1 may include one first red pixel PX_R1, two first green pixels PX_G1 and PX_G2, and one first blue pixel PX_B1. Each of the first pixels PX1 of the first pixel group PG1 may include a light emitting area EA and a non-light emitting area NEA. As an example of the present inventive concept, the light emitting area EA may have a rectangular shape, but is not limited thereto. The light emitting area EA may be arranged with light emitting elements, and the non-light emitting area NEA may be arranged with transistors for driving the light emitting elements.

A first area A1 in the first display area DA1 may be arranged with the plurality of first pixel groups PG1. The first area A1 may mean a unit area. For example, the area of the first area A1 may be about 1 inch x about 1 inch.

Within the first area A1, the first pixel groups PG1 may be arranged in a matrix shape. For example, the plurality of first pixel groups PG1 may be arranged separate from each other in the first direction DR1 and the second direction DR2.

According to FIG. 2B, the first area A1 is illustrated to have 18 first pixel groups PG1 arranged in 6 pixel group rows and in three pixel group columns, but this is exemplary for convenience of explanation and is not limited thereto. The number of the first pixel groups PG1 to be arranged in the first area A1 may be more than that.

Referring to FIGS. 2A and 2C, a plurality of second pixels PX2 may be arranged in the second area A2 in the second display area DA2. The second area A2 may include pixel areas PXA in which the plurality of second pixels PX2 are arranged respectively, and a plurality of opening areas OA1. The opening areas OA1 may not have pixels. In other words, the opening areas OA1 may be an area from which some components (e.g., light emitting elements) of the second pixels PX2 are removed. Accordingly, the resolution of the first display area DA1 may be higher than that of the second display area DA2.

The second pixels PX2 may have the same structure as the first pixels PX1. The second pixels PX2 may be grouped into a plurality of second pixel groups PG2. For example, the second pixel groups PG2 may include one second red pixel PX_R2, two second green pixels PX_G3 and PX_G4, and one second blue pixel PX_B2. Each pixel area PXA may include a light emitting area EA and a non-light emitting area NEA. As an example of the present inventive concept, the light emitting area EA may have a rectangular shape, but is not limited thereto. The light emitting area EA may be arranged with light emitting elements, and the non-light emitting area NEA may be arranged with transistors for driving the light emitting elements.

Similarly to the first area A1, the second area A2 may be defined as a unit area. In other words, the second area A2 and the first area A1 may have the same area.

As shown in FIG. 2C, the second area A2 may be arranged with four second pixel groups PG2. In the second area A2, portions other than the pixel areas PXA in which the second pixel groups PG2 are arranged may be defined as an opening area OA1. The opening area OA1 may be an optical path through which light provided from the outside penetrates. Accordingly, sensors arranged in the second display area DA2 may recognize the light transmitted through the opening area OA1, and sense user input information.

The entire area of the pixel areas PXA in the second area A2 may be smaller than that of the opening area OA1.

Furthermore, when the number of second pixels PX2 in the second area A2 is smaller than that of the first pixels PX1 in the first area A1, a brightness difference may occur between the first display area DA1 and the second display area DA2. In order to prevent the brightness difference from occurring between the first display area DA1 and the second display area DA2, the brightness of the second display area DA2 may be adjusted. Specifically, in consideration of the distance between the user and the display device, the brightness of the second display area DA2 may be adjusted to be identical to that of the first display area DAL Hereinafter, a method for adjusting the brightness of the second display area DA2 will be described.

Figure 3:
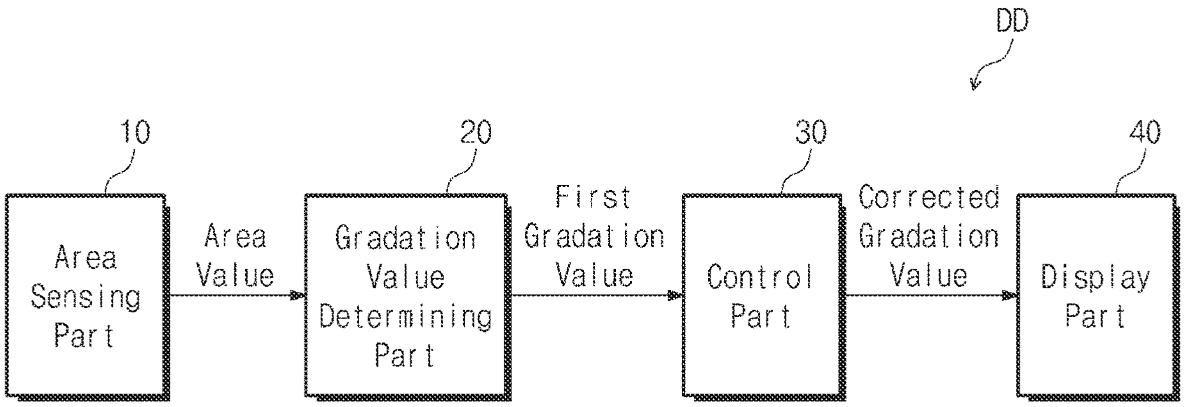
FIG. 3 is a block diagram of a display device according to an embodiment of the present inventive concept.
Figure 4:
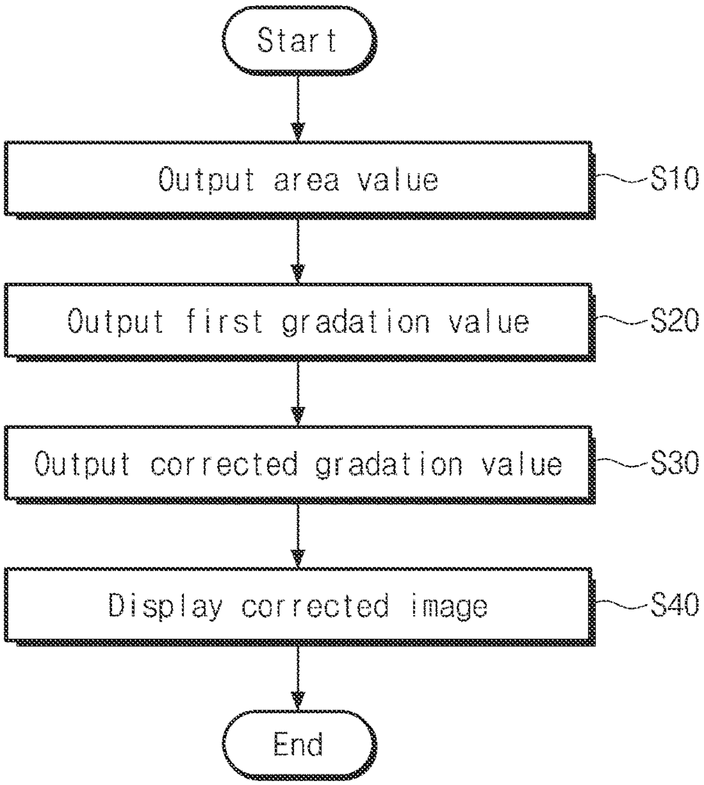
FIG. 4 is a flowchart of a method for adjusting a gradation value of a display device according to an embodiment of the present inventive concept.
Figure 5:
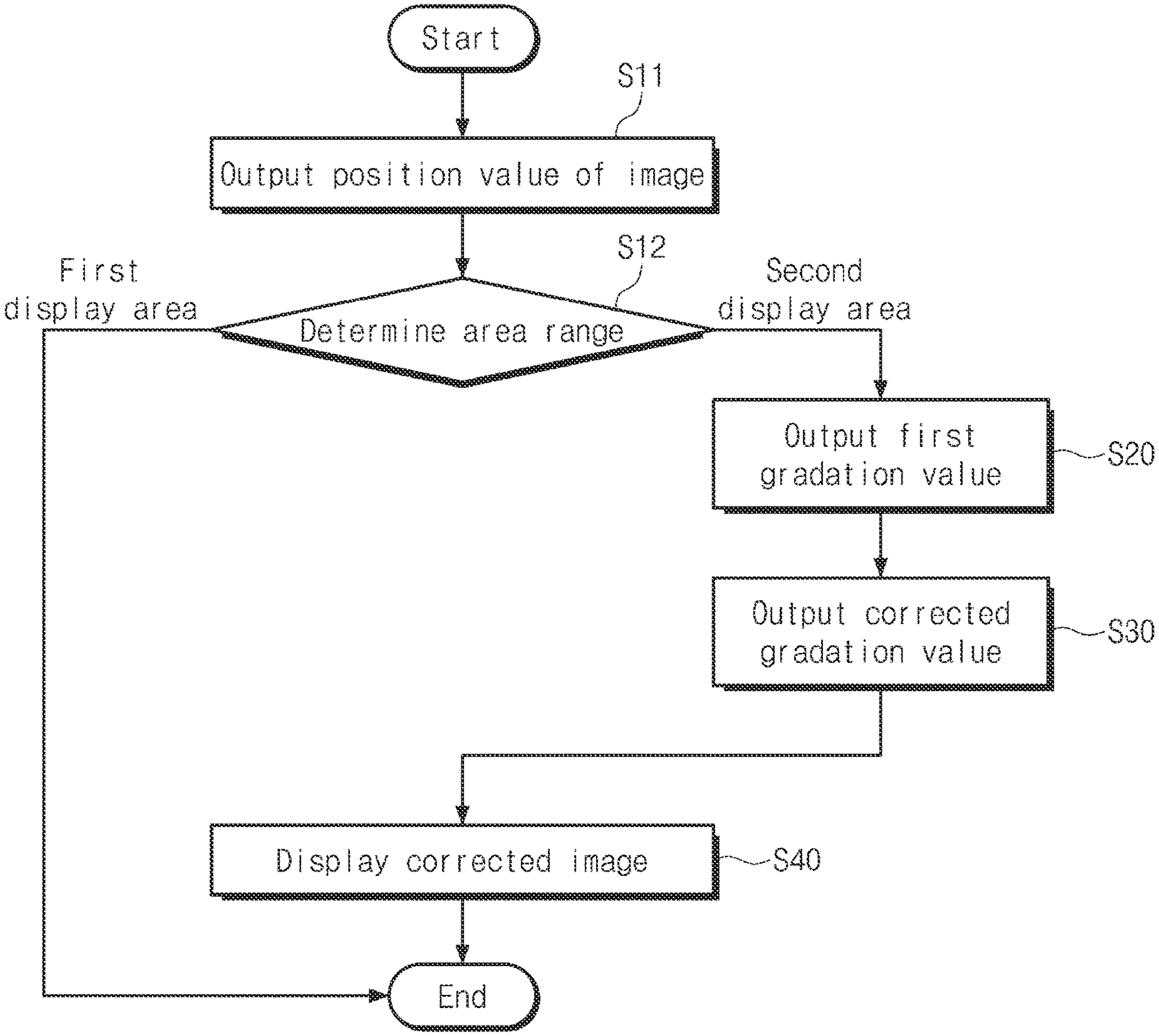
FIG. 5 is a flowchart for describing a method of a brightness control for a display device according to an embodiment of the present inventive concept.
Figure 6:
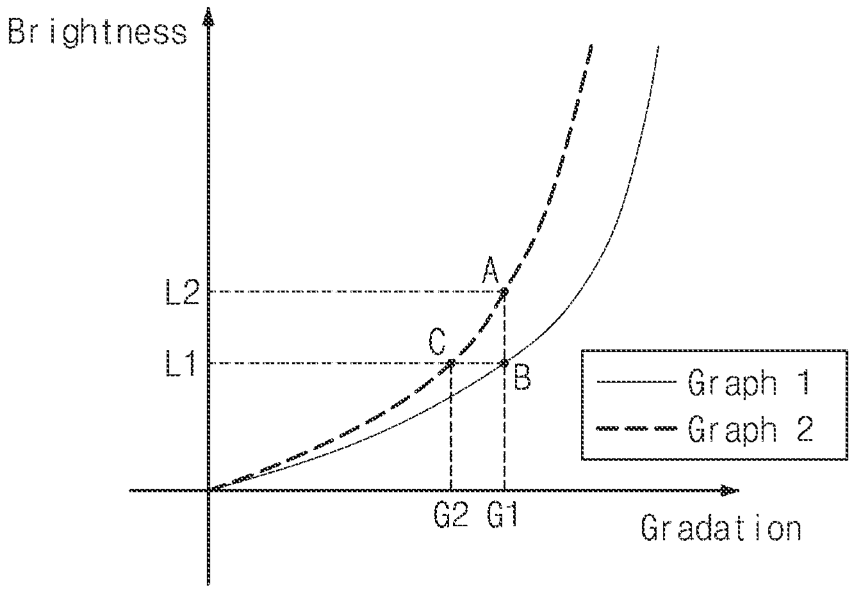
FIG. 6 illustrates brightness graphs according to gradation for each area of a display device according to an embodiment of the present inventive concept.

FIG. 3 is a block diagram of the display device DD according to an embodiment of the present inventive concept. FIG. 4 is a flowchart of a method for adjusting a gradation value of the display device DD according to an embodiment of the present inventive concept. FIG. 5 is a flowchart for describing a method of a brightness control for the display device DD according to an embodiment of the present inventive concept. FIG. 6 illustrates brightness graphs according to the gradation for each area of the display device DD according to an embodiment of the present inventive concept.

The display device DD in an embodiment may include an area sensing part 10, a gradation value determining part 20, a control part 30, and a display part 40.

The area sensing part 10 receives an image and output an area value to the gradation value determining part 20 in an area value output step S10. The area value output step S10 may include an image position value output step S11 and an area range determination step S12.

In the image position value output step S11, the position of the image in the display panel 210 (see FIG. 2A) may be output as a data value using the positions of pixels in the input image. The input image may correspond to the first pixels PX1 (see FIG. 2A) or the second pixels PX2 (see FIG. 2A) in the display panel 210. The position value of the image may be a data value for the first pixels PX1 or the second pixels PX2.

In the area range determination step S12, an area to which the image belongs may be determined according to the position value of the image, and an area value may be output. When the image is an image that corresponds to the first pixels PX1, an area value of the first display area DA1 may be output, and when the image is an image that corresponds to the second pixels PX2, an area value of the second display area DA2 may be output When the area is determined as the first display area DA1, the image may be displayed without performing a first gradation value output step S20, a corrected gradation value output step S30 and a corrected image display step S40. When the area is determined as the second display area DA2, the first gradation value output step S20, the corrected gradation value output step S30 and the corrected gradation value output step 40 are performed.

On the other hand, the input image input in the area sensing part 10 may have a brightness value. The brightness value of the input image is defined as a first brightness. Specifically, when the input image is an image corresponding to the first pixels PX1, the first brightness is a first display brightness, and when the input image is an image corresponding to the second pixels PX2, the first brightness is a second display brightness.

The gradation value determining part 20 receives the area value from the area sensing part 10 and output a first gradation value to the control part 30 in a first gradation value output step S20. In the first gradation value output step S20, a first gradation value corresponding to the first brightness which is the brightness of the input image is output. Since a case where the gradation value determining part 20 operates means that the area value for the second display area DA2 is received, the first brightness may be the second display brightness.

A procedure for outputting the first gradation value corresponding to the second display brightness will be described with reference to FIG. 6.

In FIG. 6, graph 1 is a gradation-brightness graph for the first display area DA1 and graph 2 is a gradation-brightness graph for the second display area DA2. In other words, the brightness value according to the gradation value for the first display area DA1 is exemplified in graph 1, and the brightness value according to the gradation value for the second display area DA2 is exemplified in graph 2. Graph 1 and graph 2 may be obtained by measuring data for each display device according to an embodiment using a screen brightness meter and a screen luminance meter.

For example, when a measured second display brightness for the second display area DA2 is L2, the first gradation value corresponding to the second display brightness may be found in graph 2 corresponding to the second display area DA2. Since point A on graph 2 has a gradation value of G1 and a brightness of L2, when the second display brightness is L2, the first gradation value corresponding thereto may be obtained as G1.

Referring to FIGS. 3 to 5 again, the gradation value determining part 20 may output G1 as the first gradation value to the control part 30.

The control part 30 controls an overall operation of the display device according to an embodiment of the present inventive concept. For example, the control part 30 performs a control or process related to a voice call, data communication, video call, or the like. In addition, the control part 30 may control the operation of the display part 40 other than typical functions. In other words, the control part 30 may adjust the brightness of the image displayed on the display part 40 in response to the first gradation value output from the gradation value determining part 20.

The control part 30 receives the first gradation value from the gradation value determining part 20 and output a corrected gradation value to the display part 40 in a corrected gradation value output step S30. In the corrected gradation value output step S30, a corrected gradation value is output to the display part 40 so that the second display area DA2 may have a corrected brightness same with a brightness of the first display area DA1.

When corrected to have the corrected gradation value, the input image may have the corrected brightness. The corrected brightness may be substantially the same as the first display brightness. When the image belonging to the second display area DA2 has the corrected brightness, a brightness difference between the first display area DA1 and the second display area DA2 may be reduced.

The term such as "substantially the same" should be understood as a meaning the same with an allowable measurement error that may be typically generated for a measured numerical range. Accordingly, that the corrected brightness and the first display brightness are substantially the same should be understood as a meaning that the corrected brightness is the same as the first display brightness with the allowable measurement error.

In order to find the corrected brightness, the control part 30 may refer to point B on graph 1 having the same gradation value of G1 as point A on graph 2. At point B, the brightness is L1 for the gradation value of G1. In other words, in the first display area DA1, when the gradation value is G1, the first display brightness is L1. Accordingly, the brightness of the input image may be corrected from the second display brightness L2 to the first display brightness L1, and the corrected brightness may be L1.

The control part 30 may refer to point C on graph 2 in order to find a corrected gradation value corresponding to L1 that is the corrected brightness. At point C, the gradation value is G2 and the brightness is L1. Accordingly, the corrected gradation value corresponding to the corrected brightness L1 is G2.

The control part 30 may output the corrected gradation value of G2 to the display part 40.

The display part 40 may be a part of the display panel on which the image is displayed. The display panel is not particularly limited, and may employ, for example, an organic light emitting display panel, a liquid crystal display panel, a plasma display panel, an electrophoretic display panel, an electrowetting display panel, or the like.

The display part 40 receives the corrected gradation value from the control part 30 and displays a corrected image in a corrected image display step S40. The corrected image may be an image having the corrected gradation value and the corrected brightness.

The input image may be corrected to the corrected image through the area sensing part 10, the gradation value determining part 20, the control part 30, and the display part 40.

The input image having the first gradation value and the second display brightness is corrected to the corrected image having the corrected gradation value and the corrected brightness.

The corrected brightness may have a different value from the second display brightness. For example, as the brightness of the input image is corrected from the second display brightness of L2 to the corrected brightness of L1, the corrected brightness may be smaller than the second display brightness.

In addition, the display device according to an embodiment of the present inventive concept may further include a proximity sensor for recognizing a proximal distance from the user. For example, the first electronic module 501 (see FIG. 1B) may be the proximity sensor. The proximity sensor may include an optical sensor or a thermal sensor.

The first electronic module 501 may recognize the proximal distance from the user. The control part 30 may determine the corrected gradation value in consideration of the proximal distance.

FIG. 7 illustrates a brightness graph according to a proximal distance from the second pixels PX2 according to an embodiment of the present inventive concept. Since the brightness of the second display area DA2 is defined as the second display brightness, the graph in FIG. 7 may be the second display brightness according to the proximal distance.

Referring to FIGS. 1A, 1B, 2A and 7, the second display brightness may be adjusted according the proximal distance recognized by the first electronic module 501.

In the display device DD according to an embodiment, the resolution (the number of distinct pixels in each dimension) of the second pixels PX2 may be smaller than that of the first pixels PX1. In the display device DD, the brightness of the second pixels PX2 may be decreased or increased so that the first display area DA1 and the second display area DA2 have the same brightness.

For example, since the number of the second pixels PX2 per unit area is smaller than that of the first pixels PX1, brightness of each of the second pixels PX2 may be adjusted to be greater than that of each of the first pixels PX1.

However, when the distance from the user becomes longer, for example, when the proximal distance is about 30 cm or longer, it is difficult for the user to recognize the brightness difference between the first display area DA1 and the second display area DA2. Accordingly, amount of change in the viewed brightness of each of the second pixels PX2 according to a change of the proximity distance may be saturated.

On the contrary, when the distance between the user and the display device becomes shorter, for example, when the proximal distance is about 30 cm or less, the brightness difference between each of the first pixels PX1 and each of the second pixels PX2 may be easily recognized by the user. In order to reduce the brightness difference between the first pixels PX1 and the second pixels PX2, the corrected brightness of the second pixels PX2 in case where the proximal distance is about 30 cm or less may be smaller than that of the second pixels PX2 in case where the proximal distance is about 30 cm or more. In other words, as the proximal distance is equal to or less than about 30 cm, the brightness of the second pixels PX2 may decrease. Accordingly, the corrected brightness of the second display area DA2 in which the second pixels PX2 are arranged may decrease.

When the first electronic module 501 is the proximity sensor, the control part 30 may calculate the corrected brightness in consideration of the proximal distance to output the corrected gradation value. The display part 40 may receive the corrected gradation value to display the corrected image for which the proximal distance is considered.

When the distance recognized by the first electronic module 501 is short, the user may recognize that the brightness of the second display area DA2 is relatively greater than that of the first display area DA1, when watching a screen. Here, the area sensing part 10, the gradation value determining part 20, the control part 30, and the display part 40 may gradually decrease the brightness of the second display area DA2 according to the distance.

Accordingly, in the display device according to the present inventive concept, the brightness of the second display area DA2 is controlled in various ways according to the distance from the user, and thus the brightness difference between the first display area DA1 and the second display area DA2 may be reduced. Through this, the embodiment may provide the display device that has a constant brightness for each area regardless of the distance from the user.

According to embodiments of the present inventive concept, a display device of which reliability is enhanced may be provided.

According to embodiments of the present inventive concept, a method for adjusting a gradation value may enhance the reliability of a display device.

While this inventive concept has been described with reference to exemplary embodiments thereof, it will be clear to those of ordinary skill in the art to which the present inventive concept pertains that various changes and modifications may be made to the described embodiments without departing from the spirit and technical area of the present inventive concept as defined in the appended claims and their equivalents.

Thus, the scope of the present inventive concept shall not be restricted or limited by the foregoing description, but be determined by the broadest permissible interpretation of the following claims.

What is claimed is:

1. A display device comprising:

a display panel comprising a first display area, and a second display area surrounded by the first display area; and a proximity sensor configured to measure a distance between the display device and a user, wherein the number of first pixels disposed per unit area of the first display area is greater than the number of second pixels disposed per unit area of the second display area, wherein a corrected brightness of each of the second pixels is determined according to the distance measured by the proximity sensor, and wherein the corrected brightness of each of the second pixels under a first condition is lower than the corrected brightness of each of the second pixels under a second condition different from the first condition.

2. The display device of claim 1, wherein the first condition is when the distance between the display device and the user is equal to or less than a reference distance, and wherein the second condition is when the distance between the display device and the user is greater than the reference distance.

3. The display device of claim 2, wherein the reference distance is 30 cm.

4. The display device of claim 1, wherein the corrected brightness of each of the second pixels decreases as the distance decreases under the first condition.

5. The display device of claim 1, wherein the corrected brightness of each of the second pixels increases and then becomes saturated as the distance increases under the second condition.

6. The display device of claim 1, wherein the proximity sensor comprises an optical sensor or a thermal sensor.

7. The display device of claim 1, wherein a light transmittance of the first display area is smaller than that of the second display area.

8. The display device of claim 1, wherein the second display area comprises pixel areas in which the second pixels are disposed, and opening areas having no pixel, and wherein an entire area of the pixel areas in the second display area is smaller than that of the opening areas.

9. The display device of claim 1, further comprising:

a camera module arranged under the second display area.

10. A method for adjusting a gradation value comprising:

determining a position of an input image whether the input image is an image corresponding to a first display area or a second display area having a resolution less than that of the first display area and outputting an area value that indicates the position of the input image;

outputting a first gradation value corresponding to a brightness of the input image according to the area value;

outputting a corrected gradation value corresponding to the first gradation value; and displaying a corrected image having a corrected brightness corresponding to the corrected gradation value, wherein the brightness of the input image is a first display brightness when the input image is an image corresponding to the first display area and the brightness of the input image is a second display brightness when the input image is an image corresponding to the second display area, wherein the first display brightness is smaller than the second display brightness for the same gradation, and wherein a light transmittance of the first display area is smaller than that of the second display area.

11. The method of claim 10, wherein the input image is displayed when the input image is the image corresponding to the first display area.

12. The method of claim 10, wherein the corrected brightness and the second display brightness are different from each other.

13. The method of claim 10, wherein the corrected brightness is smaller than the second display brightness.

14. The method of claim 10, wherein the corrected brightness is substantially the same as the first display brightness.

15. The method of claim 10, further comprising:

recognizing a distance between the image and a user using a proximity sensor.

16. The method of claim 15, wherein as the recognized distance becomes smaller, the corrected brightness decreases.

17. The method of claim 15, wherein the proximity sensor comprises an optical sensor or a thermal sensor.

18. The method of claim 10, wherein a resolution of the first display area is greater than that of the second display area, and the first display area surrounds the second display area.

19. The method of claim 10, wherein the second display area comprises pixel areas in which the plurality of pixels are arranged respectively, and opening areas having no pixel, and an entire area of the pixel areas in the second display area is smaller than that of the opening areas.

* * * * *